United States Patent [19]
Khan

[11] Patent Number: 5,058,180
[45] Date of Patent: Oct. 15, 1991

[54] NEURAL NETWORK APPARATUS AND METHOD FOR PATTERN RECOGNITION

[75] Inventor: Emdadur R. Khan, San Jose, Calif.

[73] Assignee: National Semiconductor Corporation, Santa Clara, Calif.

[21] Appl. No.: 516,753

[22] Filed: Apr. 30, 1990

[51] Int. Cl.$^5$ .............................................. G06K 9/00
[52] U.S. Cl. ........................................ 382/14; 382/15; 382/36; 364/972.4; 364/274.9
[58] Field of Search .............................. 382/14, 15, 36; 364/274.9, 972.4

[56] References Cited

U.S. PATENT DOCUMENTS 4,876,731 10/1989 Loris et al. ............................. 382/40
4,914,708 4/1990 Carpenter et al. ..................... 382/14

OTHER PUBLICATIONS

Computer Visions, Graphics, and Image Processing 1987, 37, 54–115.

L. D. Jackel, H. P. Graf, J. S. Denker, D. Henderson and I. Guyon, "An Application of Neural Net Chips: Handwritten Digit Recognition," ICNN Proceeding, 1988, pp. II-107-15.

G. A. Carpenter and S. Grossberg, "The Art of Adaptive Pattern Recognition by a Self-Organizing Neural Network," IEEE Computer, Mar. 1988, pp. 77–88.

T. F. Pawlicki, D. S. Lee, J. J. Hull and S. N. Srihari, "Neural Network Models and their Application to Handwritten Digit Recognition," ICNN Proceeding, 1988, pp. II-63-70.

E. Gullichsen and E. Chang, "Pattern Classification by Neural Network: An Experiment System for Icon Recognition," ICNN Proceeding on Neural Networks, Mar. 1987, pp. IV-725-32.

S. Grossberg and G. Carpenter, "A Massively Parallel Architecture for a Self-Organizing Neural Pattern Recognition Machine," Computer Vision, Graphics, and Image Processing (1987, 37, 54–115), pp. 252–315.

R. P. Lippman, "An Introduction to Computing with Neural Nets," IEEE ASSP Magazine, Apr. 1987, pp. 4–22.

Primary Examiner—David K. Moore
Assistant Examiner—Daniel Santos
Attorney, Agent, or Firm—Limbach, Limbach & Sutton

[57] ABSTRACT

A self-organizing neural network having input and output neurons mutually coupled via bottom-up and top-down adaptive weight matrics performs pattern recognition while using substantially fewer neurons and being substantially immune from pattern distortion or rotation. The network is first trained in accordance with the adaptive resonance theory by inputting reference pattern data into the input neurons for clustering within the output neurons. The input neurons then receive subject pattern data which are transferred via a bottom-up adaptive weight matrix to a set of output neurons. Vigilance testing is performed and multiple computed vigilance parameters are generated. A predetermined, but selectively variable, reference vigilance parameter is compared individually against each computed vigilance parameter and adjusted with each comparison until each computed vigilance parameter equals or exceeds the adjusted reference vigilance parameter, thereby producing an adjusted reference vigilance parameter for each output neuron. The input pattern is classified according to the output neuron corresponding to the maximum adjusted reference vigilance parameter. Alternatively, the original computed vigilance parameters can be used by classifying the input pattern according to the output neuron corresponding to the maximum computer vigilance parameter.

33 Claims, 8 Drawing Sheets

| INPUT | EXEMPLARS AFTER EACH INPUT |
|---|---|
| C | C |
| E | C E |
| F | C E F |
| F | C E F |
| F | C E F F |

FIG. 4

| | | TYPICAL INPUT PATTERNS | |
|---|---|---|---|
| | PATTERN NUMBER | PATTERN GROUP A | PATTERN GROUP B |
| | 1 | 1 | 2 |
| | 2 | \ | 2 |
| | 3 | 1 | 2 |
| | 4 | 1 | 2 |

| GROUP | PAT-TERN | STANDARD (S) $P_{arjSM}$ | DIGIT | LEFT (L) $P_{arjLM}$ | DIGIT | RIGHT (R) $P_{arjRM}$ | DIGIT | WINNER $P_{arjM}$ | DIGIT | LAYER |
|---|---|---|---|---|---|---|---|---|---|---|
| B | 1 | .82 | 2 | .75 | 2 | .76 | 9 | .82 | 2 | S |
| | 2 | .85 | 2 | .74 | 8 | .81 | 2 | .85 | 2 | S |
| | 3 | .84 | 2 | .78 | 6 | .78 | 2 | .84 | 2 | S |
| | 4 | .86 | 2 | .80 | 3 | .87 | 2 | .87 | 2 | R |
| A | 1 | .93 | 1 | .86 | 7 | .81 | 3 | .87 | 1 | S |
| | 2 | .89 | 3 | .93 | 1 | .81 | 3 | .93 | 1 | L |
| | 3 | .76 | 2 | .82 | 7 | .85 | 1 | .85 | 1 | R |
| | 4 | .87 | 2 | .87 | 7 | .93 | 1 | .93 | 1 | R |

NEURAL NETWORK APPARATUS AND METHOD FOR PATTERN RECOGNITION

BACKGROUND OF THE INVENTION

1. Field of the Invention

The present invention relates to signal processors, and in particular, to neural networks used in signal processors for pattern recognition.

2. Description of the Related Art

In recent years, neural networks have become more important in the implementation of intelligent and real time systems. Neural networks have a large number of simple processing modules among which processing is distributed and performed simultaneously. The large number of interconnections between the processing modules serve as the memory for the neural network.

The importance of neural networks is particularly evident in the field of pattern recognition, and still more particularly in the field of recognition of handwritten digits. Pattern recognition, and especially recognition of handwritten digits, is important in a number of fields and disciplines. As one very important example, the United States Postal Service has a critical need for a fast and highly accurate hand written digit recognition apparatus or method for automated recognition of handwritten zip codes on pieces of mail. Neural networks are particularly attractive in this area due to their self-organization, i.e., learning capabilities.

One neural network which is useful for implementing an adaptive pattern recognition network is structured according to a "competitive learning model" ("CLM") and is illustrated in FIG. 1. The CLM network 10 has two sets of nodes, or "neurons," coupled together via an adaptive weight matrix.

The first set 12 of neurons is referred to as the "F1 layer" and contains the input neurons $14a-14m$. The second set 13 of neurons is referred to as the "F2 layer" and contains the output neurons $22a-22n$. Each of the input neurons $14a-14m$ respectively receives an input signal $I_1-I_M$. These input signals $I_1-I_M$ represent the image or pattern information sought to be recognized. For example, the input signals $I_1-I_M$ can be signals representing individual pixels from the image or pattern sought to be recognized (where M=the number of pixels).

The input subject pattern information $I_i$ is typically pixel-mapped information. The subject pattern sought to be recognized is typically first captured as a video image by a conventional video camera and frame grabber (not shown), wherein signal thresholds are used to adapt any gray level information into black or white information. This black and white information is scaled both horizontally and vertically to fit within a video frame of a preselected size. The video frame can be of virtually any size, with common sizes being $16 \times 16$ or $8 \times 8$ pixels. The horizontal scaling left justifies the pattern information and is proportioned to the vertical scaling to prevent excessive distortion of the scaled, pixel-mapped subject pattern information.

The scaled, pixel-mapped subject pattern information is "skeletonized" to eliminate unnecessary pixels within the subject pattern until only absolutely necessary subject pattern lines, i.e., its "skeleton," remain. This reduces broad lines or strokes to thin lines or strokes. This skeletonized, pixel-mapped subject pattern information is outputted as the pattern information $I_i$.

The first input neuron $14a$ divides or replicates its input signal $I_1$ into multiple pattern signals $16aa-16an$ for coupling to the adaptive weight matrix 18. Each pattern signal $16aa-16an$ is individually coupled to its own respective matrix element, or "weight," $18aa-18an$. Each pattern signal $16aa-16an$ is weighted, e.g., multiplied, by its respective matrix element $18aa-18an$ to produce weighted pattern signals $20aa-20an$. These weighted pattern signals $20aa-20an$ are coupled respectively to output neurons $22a-22n$.

The input signal $I_1$ can be an analog voltage or current, with the pattern signals $16aa-16an$ also being analog voltages or currents. Each of the analog pattern signals $16aa-16an$ can be non-scaled, i.e., equal to the value of the input signal $I_1$ (e.g., by using voltage followers or current mirrors); or each can be scaled, e.g., have a value equal to the value of the input signal $I_1$ divided by K, where K is a number which can be arbitrarily selected as a scaling factor. Alternatively, the input signal $I_1$ can be a digital signal (e.g., a single binary bit), with each of the pattern signals $16aa-16an$ being an identically valued digital signal.

As will be recognized by one of ordinary skill in the art, if the input signal $I_1$ and the pattern signals $16aa-16an$ are analog voltages or currents, the matrix elements $18aa-18an$ can consist of resistors or appropriately biased transistors, or combinations thereof. Such components can be coupled together by means known in the art to perform amplification or attenuation of the voltages or currents for the weighting of the pattern signals $1611-16an$, as described above.

As will further be recognized by one of ordinary skill in the art, if the input signal $I_1$ and the signals $16aa-16an$ are digital signals, the pattern matrix elements $18aa-18an$ can consist of appropriate digital logic circuits (e.g., digital adders, digital dividers). Such components can be coupled together by means known in the art to perform multiplication or division of the digital signals for the weighting of the pattern signals $16aa-16an$, as described above.

The first output neuron $22a$ receives and sums together its weighted pattern signals $20aa-20ma$ to produce one output signal $V_1$. If these weighted pattern signals $20aa-20ma$ are analog electrical currents, the output neuron $22a$ can simply consist of signals $20aa-20ma$ are digital bits, the output neuron $22a$ can be a digital adder circuit with the output signal $V_1$ being a digital signal representing the summation thereof.

The foregoing signal processing is similarly performed with the remaining input neurons $14b-14m$, matrix elements $18ba-18mn$ within the adaptive weight matrix 18 and output neurons $22b-22n$.

In the CLM network 10 only the largest of the output neuron output signals $V_1-V_M$ is used, hence the name "competitive learning." The output neurons $22a-22n$ compete to produce an output signal $V_j$ to be selected for use in classifying the input pattern information as represented by the input pattern signals $I_1-I_M$.

The matrix elements, or adaptive weights, within the adaptive weight matrix 18 which abut the winning output neuron are modified, i.e., they "learn." For example, if the "jth" output neuron $22j$ is the winning node, as described above, the adaptive weight vector $Z_j=(Z_{1j}, Z_{2j}, \ldots, Z_{mj})$ representing the adaptive weights within the adaptive weight matrix 18 which abut the winning node $22j$ is modified. This modification is done to reduce the error between itself and the input pattern information signals $I_1-I_M$ (i.e., pattern signals $16aj$–$16mj$). For example, this modification for each matrix element can be represented by the following formula:

$$\frac{d}{dt} Z_{ij} = \epsilon X_j(-Z_{ij} + X_i)$$

where:

$\epsilon$ = error between the adaptive weight vector $Z_j$ and the pattern signal vector $X_j$.

$$X_i = I_i \text{ if the pattern signals } 16aa\text{–}16an \text{ are non-scaled (as discussed above); or}$$

$$= \frac{I_i}{K} \text{ if the pattern signals } 16aa\text{–}16an \text{ are scaled.}$$

A CLM network 10 works well to classify, or "cluster," input patterns if the input patterns do not form too many clusters relative to the number of output neurons 22a–22n in the F2 layer 13. If the number of clusters does not exceed the number of output neurons 22a–22n, the adaptive weight matrix 18 eventually stabilizes with respect to its learning process and produces a good distribution of adaptive weight vectors for classifying input patterns.

However, a CLM network 10 does not always learn and maintain a temporally stable adaptive weight matrix 18. Changes over time in the probabilities of input patterns or in the sequencing of input patterns can "wash away" prior learning by the adaptive weight matrix 18, thereby producing memory washout.

To overcome these limitations of a CLM network, another network has been developed according to a model suggested by a theory referred to as "adaptive resonance theory" ("ART"). An embodiment of such a network is illustrated in FIG. 2.

The ART network 40, similar to the CLM network 10, has an F1 layer 42 and an F2 layer 44 coupled via an adaptive weight matrix 46. This adaptive weight matrix 46, having matrix coefficients $Z_{ij}$, is referred to as a "bottom-up" adaptive weight matrix.

Input pattern information $I_i$ is received by the F1 layer 42 and is transformed to pattern information signals $X_i$ 50 which are coupled to the bottom-up adaptive weight matrix 46, a top-down adaptive weight matrix 52 (having coefficients $Z_{ji}$) and a pattern signal summer 54. The F2 layer 44 receives the weighted pattern signals 56 and transforms them to output signals $V_j$ 58, as described above for the CLM network 10 in FIG. 1. These output signals 58 are coupled into a pattern classifier 60 wherein the highest valued output signal $V_{jm}$ is selected and used (as described below) to select pattern data corresponding thereto which is stored in a pattern memory 62. For a digital implementation the selected output signal $V_{jm}$ is set to a logical one and all other output signals $V_j$ are set to logical zeroes.

The pattern signals $X_i$ 50 are multiplied by the coefficients $Z_{ji}$ of the top-down adaptive weight matrix 52 and summed together by the top-down summer 64. The result 66 of this summation and the result 68 of the summation of the pattern signals $X_i$ 50 by the pattern signal summer 54 are coupled into a vigilance tester 70. The vigilance tester 70 divides the result 66 produced by the top-down summer 64 by the result 68 produced by the pattern signal summer 54 to produce (internally to the vigilance tester 70) a computed vigilance parameter $P_{cjm}$. This computed vigilance parameter $P_{cmj}$ corresponds to the output neuron within the F2 layer 44 producing the highest valued output signal $V_{jm}$. This is assured since the pattern classifier 60 dictates, via an interface 72, that the coefficients $V_{ji}$ which correspond to the output neuron producing the maximum output signal $V_{jm}$ are used.

The vigilance tester 70 compares the computed vigilance parameter $P_{cjm}$ with a reference vigilance parameter $P_r$. If the computed vigilance parameter $P_{cjm}$ does not equal or exceed the reference vigilance parameter $P_r$, the vigilance tester 70 outputs a disablement command as its F2 layer interface signal 74 to disable the output neuron within the F2 layer 44 corresponding to that particular computed vigilance parameter $P_{cjm}$. The second highest output signal $V_j$ is then selected by the pattern classifier 60 and a new computed vigilance parameter $P_{cjm}$ is computed, using the appropriate coefficients $Z_{ji}$ of the top-down adaptive weight matrix 52.

When a computed vigilance parameter $P_{cjm}$ results which equals or exceeds the reference vigilance parameter $P_r$, the vigilance tester 70 causes the coefficients $Z_{ij}$ of the bottom-up adaptive weight matrix 46 and the coefficients $Z_{ji}$ of the top-down adaptive weight matrix 52 to change, or "learn," in accordance with the pattern information signals $X_i$ 50 (as explained more fully below). This "learning" is effected via learning enablement signals 76, 78 outputted by the vigilance tester 70 to the bottom-up 46 and top-down 52 adaptive weight matrices.

When a computed vigilance parameter $P_{cjm}$ which equals or exceeds the reference vigilance parameter $P_r$ has been computed as described above, the output signal $V_{jm}$ corresponding thereto is selected by the pattern classifier 60 and used to select pattern data from the pattern memory 62 for outputting therefrom. This selected pattern data represents the pattern recognized as corresponding to the input pattern information $I_i$. The vigilance tester 70 then outputs an enablement command as its F2 layer interface signal 74 to re-enable any of the output neurons within the F2 layer 44 which had been previously disabled, and the foregoing process is repeated for the next pattern.

A simplified flow chart illustrating the foregoing operational description of the ART network 40 is illustrated in FIG. 3. The first step 80 is to initialize the values of: L (a preselected convergence parameter, as discussed below); M (equal to the number of input neurons and the number of pixels representing the input pattern); N (equal to the number of output neurons and the number of patterns sought to be recognized); $P_r$ (reference vigilance parameter); $Z_{ij}(0)$ (bottom-up matrix coefficients at time t=0); $Z_{ji}(0)$ (top-down matrix coefficients at time t=0).

The value for L can be any arbitrary value greater than one, i.e., L>1 (described more fully below). The values for M and N are dependent upon and selected to be equal to the numbers of pixels representing the input pattern and patterns sought to be recognized (e.g., clusters), respectively. The value for the reference vigilance parameter $P_r$ is initialized to have a value between zero and one (i.e., $0 < P_r < 1$) as described more fully below. The values for the top-down matrix coefficients $Z_{ji}(0)$ are all initialized to have a value of one (i.e., $Z_{ji}(0) = 1$). The values for the bottom-up matrix coefficients $Z_{ij}(0)$ are initialized to have values between zero and the quotient $L/(L-1+M)$, i.e., according to the following formula:

$$0 < Z_{ij}(0) < \frac{L}{L-1+M}$$

The next step 82 is to input the input pattern information $I_i$. These values $I_i$ are inputted into the F1 layer 42 as described above.

The next step 84 is to compute matching scores, namely, the values for the signals $V_j$ outputted by the output neurons. The values for the respective outputs $V_j$, as described above, are computed by summing the respective inputs into each one of the output neurons. Mathematically, this operational step 84 may be written according to the following formula:

$$\left[ V_j = \sum_{i=1}^{M} Z_{ij}(t) X_i \right]_{j=1}^{N}$$

The next step 86 is to select the best match exemplar, namely, the highest valued output signal $V_{jm}$ from the output neurons. Mathematically, this step may be summarized according to the following formula:

$$V_{jm} = \text{MAX}\{V_j|_{j=1}^{N}\}$$

The next step 88 is to compute the vigilance parameter $P_{cjm}$. This computation is performed by summing the products of the pattern signals $X_i$ and the corresponding top-down matrix coefficients $Z_{ji}$ and dividing the result thereof by the summation of the pattern signals $X_i$. Mathematically, this operational step may be summarized according to the following formula:

$$P_{cjm} = \frac{\sum_{i=1}^{M} Z_{ji} X_i}{\sum_{i=1}^{M} X_i}$$

The next step 90 is to compare the computed vigilance parameter $P_{cjm}$ against the reference vigilance parameter $P_r$. If the computed vigilance parameter $P_{cjm}$ does not equal or exceed the reference vigilance parameter $P_r$, the output neuron corresponding to the computed vigilance parameter $P_{cjm}$ is disabled, i.e., its output signal $V_{jm}$ is temporarily set to zero (i.e., $V_{jm}=0$), and the operation resumes by repeating several of the foregoing steps.

If the computed matching scores $V_j$ were stored, operation resumes with the step 86 of selecting the next best matching exemplar. If the computed matching scores $V_j$ had not been saved, operation resumes with the step 84 of re-computing the matching scores $V_j$, while omitting the output $V_j$ from the output neuron disabled in the disabling step 92.

When the computed vigilance parameter $P_{cjm}$ equals or exceeds the reference vigilance parameter $P_r$, the next step 94 is to adapt the best matching exemplar. This is done by modifying the bottom-up $Z_{ij}$ and top-down $Z_{ji}$ matrix coefficients in accordance with the pattern signals $X_u$ representing the input pattern. This modifying (i.e., "learning") is performed in accordance with the following mathematical formulas:

$$\left[ Z_{ij} = \left[ \frac{L}{L-1+\sum_{i=1}^{M} X_i} \right] X_i \right]_{i=1}^{M}$$

$$[Z_{ji} = X_i]_{i=1}^{M}$$

The last step 96 is to re-enable any output neurons which may have been disabled in the disabling step 92 following the step 90 of comparing the computed vigilance parameter $P_{cjm}$ with the reference vigilance parameter $P_r$. Once any disabled output neurons have been re-enabled, operation resumes with the step 82 of inputting new pattern information $I_i$.

Summarizing, the input pattern information $I_i$ activates the F1 layer 42. The information or signals $X_i$ produced by the F1 layer 42, in turn, activate the F2 layer 44, producing an output signal $V_j$ corresponding to the output neuron therein receiving the largest total signal from the F1 layer 42, as described above. The top-down matrix coefficients $Z_{ji}$ corresponding to this output neuron represent a learned "expectation" with respect to the input pattern information $I_i$. If this expectation, as represented by the computed vigilance parameter $P_{cjm}$, is not met, i.e., does not equal or exceed the reference vigilance parameter $P_r$, then that particular output neuron's signal is ignored and the remaining output neurons' signals are examined to see if a match exists. If the expectation is met, i.e., the computed vigilance parameter $P_{cjm}$ equals or exceeds the reference vigilance parameter $P_r$, then the corresponding bottom-up $Z_{ij}$ and top-down $Z_{ji}$ matrix coefficients are adjusted in accordance with the input information $I_i$, as represented by the pattern signals $X_i$, which has thereby been found to closely match the expectation represented by the top-down matrix coefficients $Z_{ji}$.

Thus, the ART network 40 allows "learning" (i.e., alteration of its adaptive weight matrices' coefficients) to occur only if the input pattern information $I_i$ is sufficiently similar to any of its learned expectations. If the input information $I_i$ is not sufficiently similar, no "learning" takes place.

However, if examination of the input information $I_i$ results in the selection of an uncommitted output neuron within the F2 layer 44, the bottom-up $Z_{ij}$ and top-down $Z_{ji}$ matrix coefficients corresponding to this previously uncommitted output neuron "learn" accordingly, as described above. Further however, if the full capacity of the ART network 40 has been exhausted, i.e., no further uncommitted output neurons exist within the F2 layer 44, and no match exists with any committed output neurons, learning is inhibited.

Thus, the ART network 40 prevents memory wash-out by not allowing its adaptive weight matrices to be altered unless the input pattern information closely matches the learned expectations already represented thereby. However, because the ART network 40 has a fixed reference vigilance parameter, only "perfect" input pattern information, i.e., input pattern information producing a computed vigilance parameter equaling or exceeding the reference vigilance parameter, will be recognized and allowed to instigate further learning by the adaptive weight matrices. Input pattern information which is less than "perfect" will be clustered via new, previously uncommitted output neurons until no further uncommitted output neurons exist.

An example of this operation of an ART network 40 resulting in clusters, or "exemplars," of patterns is shown in FIG. 4. Three patterns ("C," "E" and "F") inputted for recognition are shown in the left column. The resulting output patterns, after each input pattern has been applied, are shown in the right column. These output patterns resulted when an 8×8 video frame (i.e., 64 pixels) was used with a reference vigilance parameter $P_r$ of 0.9. This was sufficient to create separate exemplar patterns for each letter.

The network 40 correctly recognized "C," "E" and "F" as they were inputted sequentially. The fourth input pattern, a "noisy" "F" with a missing pixel in its upper line, was correctly classified as an "F." However, the fifth input pattern, another noisy "F" with a missing pixel in its left line, was considered different and a new exemplar was created. Creation of further exemplars for noisy "F" inputs will occur, leading to a growth of noisy "F" exemplars.

Therefore, although the ART network 40 prevents the memory washout associated with CLM networks, its associated problems include recognition of only "perfect" patterns and overloading of the system with excessive clustering of less than perfect input patterns. As illustrated by the example of FIG. 4, even a small amount of noise can cause serious problems, and even with no noise the reference vigilance parameter $P_r$ can be set such that two patterns which are most similar will be "recognized" as different.

Thus, it would be desirable to have a neural network capable of preventing memory washout, allowing recognition of closely matching, albeit less than perfect, input pattern information and preventing system overload by excessive clustering of non-perfect input pattern information.

Further background information on neural networks suggested by the adaptive resonance theory may be found in: "Neural Networks and Natural Intelligence," by Stephen Grossberg and Gail A. Carpenter, Library of Congress, 1988, pages 251-312; "The ART of Adaptive Pattern Recognition By a Self-Organizing Neural Network," by Gail A. Carpenter and Stephen Grossberg, I.E.E.E. Computer Magazine, March 1988, pages 77-88; and "An Introduction to Computing With Neural Nets," by R. P. Lippmann, I.E.E.E. A.S.S.P. Magazine, April 1987, pages 4-22.

SUMMARY OF THE INVENTION

A neural network in accordance with the present invention prevents memory washout, allows recognition of closely matching but less than perfect input pattern information, and prevents overloading of the system caused by excessive clustering of input pattern information.

A neural network in accordance with the present invention comprises an F1 layer having a plurality of input neurons coupled to accept input pattern data representing a pattern, an F2 layer having a plurality of output neurons, a bottom-up adaptive weight matrix coupling the F1 layer's input neurons to the F2 layer's output neurons, and a top-down adaptive weight matrix coupling the F2 layer's output neurons to the F1 layer's input neurons.

The network is initially trained in accordance with the adaptive resonance theory by inputting reference pattern information signals into the F1 layer for clustering within the F2 layer. The bottom-up and top-down adaptive weight matrices, after being initialized, are trained in accordance with vigilance parameter testing, whereby vigilance parameters are computed, based upon the incoming reference pattern information and the coefficients of the top-down adaptive weight matrix, and compared with a preselected reference vigilance parameter. Once the network has been trained to recognize a set of reference patterns, pattern information representing subject patterns sought to be recognized are inputted into the F1 layer.

A preferred embodiment of a neural network in accordance with the present invention improves upon a neural network structured in accordance with the adaptive resonance theory by eliminating the fixed reference vigilance parameter in favor of an adjustable reference vigilance parameter when analyzing the subject pattern information. The network computes the vigilance parameter corresponding to each output neuron within the F2 layer and compares it against the reference vigilance parameter. If the computed vigilance parameter equals or exceeds the reference vigilance parameter, then the reference vigilance parameter is associatively stored in memory. If the computed vigilance parameter is less than the reference vigilance parameter, then the reference vigilance parameter is selectively adjusted, i.e., reduced, by small increments until the computed vigilance parameter equals or exceeds this adjusted reference vigilance parameter, whereupon this adjusted reference vigilance parameter is associatively stored in memory. Once vigilance parameters (reference or adjusted reference) have been associatively stored to correspond with each output neuron, the subject pattern is classified according to the output neuron associated with the highest vigilance parameter (reference or adjusted reference).

An alternative preferred embodiment of a neural network in accordance with the present invention uses the computed vigilance parameter directly, i.e., the subject pattern is classified according to the output neuron associated with the highest computed vigilance parameter.

Thus, a neural network in accordance with the present invention prevents memory washout by not changing the coefficients of its bottom-up or top-down adaptive weight matrices once they have been trained. Instead, the network adjusts its reference vigilance parameter in accordance with computed vigilance parameters based upon the inputted subject pattern information, or uses the computed vigilance parameters directly, when determining which learned pattern best matches the subject pattern information.

Furthermore, a neural network in accordance with the present invention is capable of recognizing less than perfect patterns. By not changing its adaptive weight matrix coefficients, but instead computing and comparing passing reference vigilance parameters corresponding to each of its learned patterns, or by comparing the computed vigilance parameters directly, the network can more flexibly hypothesize which of its previously learned patterns best matches the incoming subject pattern information.

Moreover, a neural network in accordance with the present invention prevents overloading of its F2 layer by avoiding excessive clustering of learned patterns, while at the same time needing fewer output neurons within its F2 layer. By not changing its learned adaptive weight matrices' coefficients, but instead computing and comparing passing reference vigilance parameters corresponding to each previously learned pattern, or by comparing the computed vigilance parameters directly, incoming subject pattern information is matched with previously learned patterns, rather than clustered to continually create new learned patterns.

These and other objectives, features and advantages of the present invention will be readily understood upon consideration of the following detailed description of certain preferred embodiments and the accompanying drawings.

BRIEF DESCRIPTION OF THE DRAWINGS

FIG. 4 illustrates resultant output pattern exemplars produced by a neural network structured in accordance with the adaptive resonance theory.

DETAILED DESCRIPTION OF THE INVENTION

Figure 5:
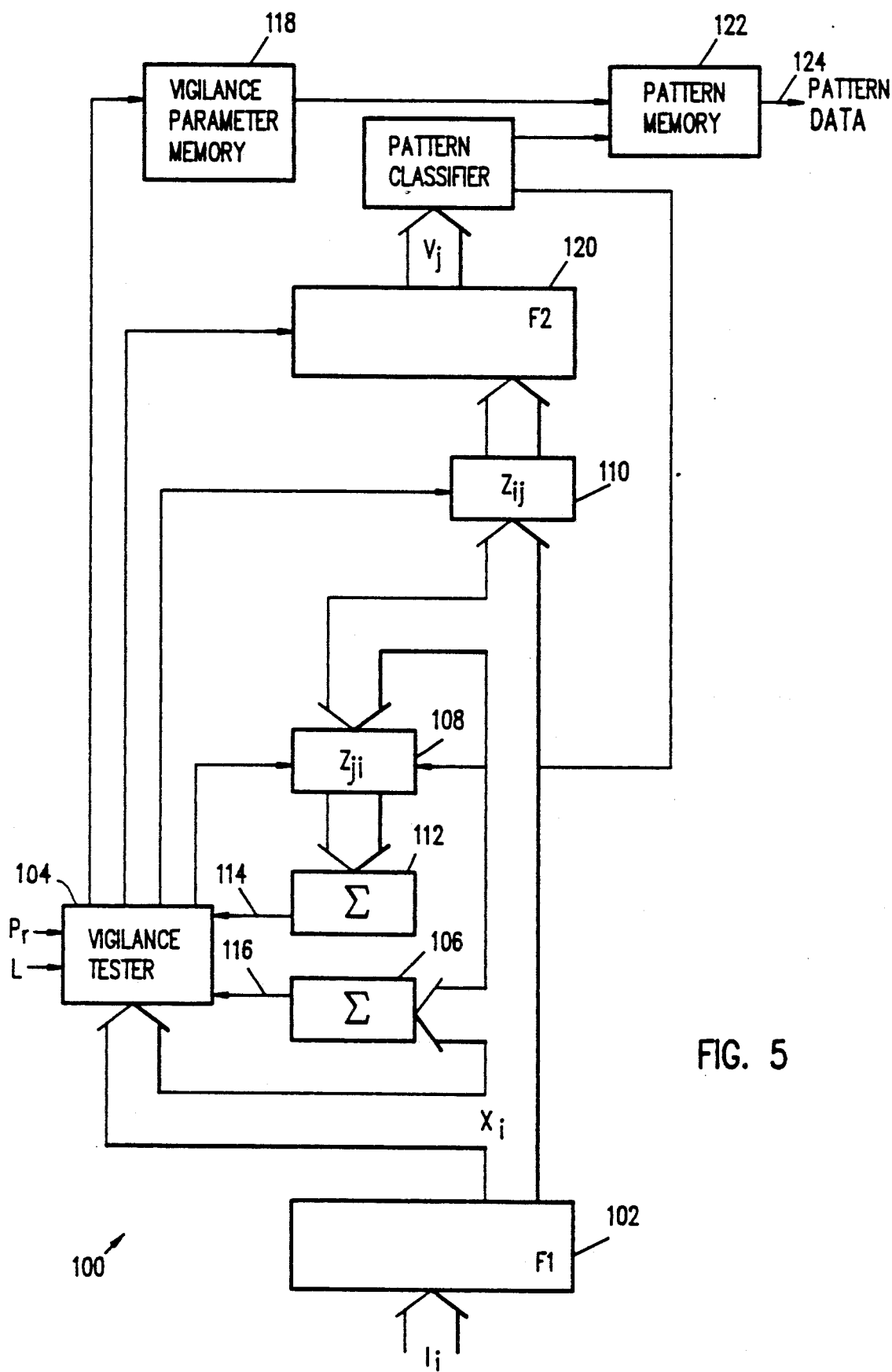
FIG. 5 illustrates in simplified, functional block diagram form a preferred embodiment of a neural network in accordance with the present invention.

Referring to FIG. 5, a preferred embodiment of a neural network 100 in accordance with the present invention is first trained with reference pattern information signals in accordance with the adaptive resonance theory network, as described above. The input pattern information signals $I_i$ are inputted into the input neurons within the F1 layer 102. The pattern signals $X_i$ generated by the input neurons within the F1 layer 102 are coupled into vigilance tester 104, pattern signal summer 106, top-down adaptive weight matrix multiplier 108 and bottom-up adaptive weight matrix multiplier 110.

Figure 1:
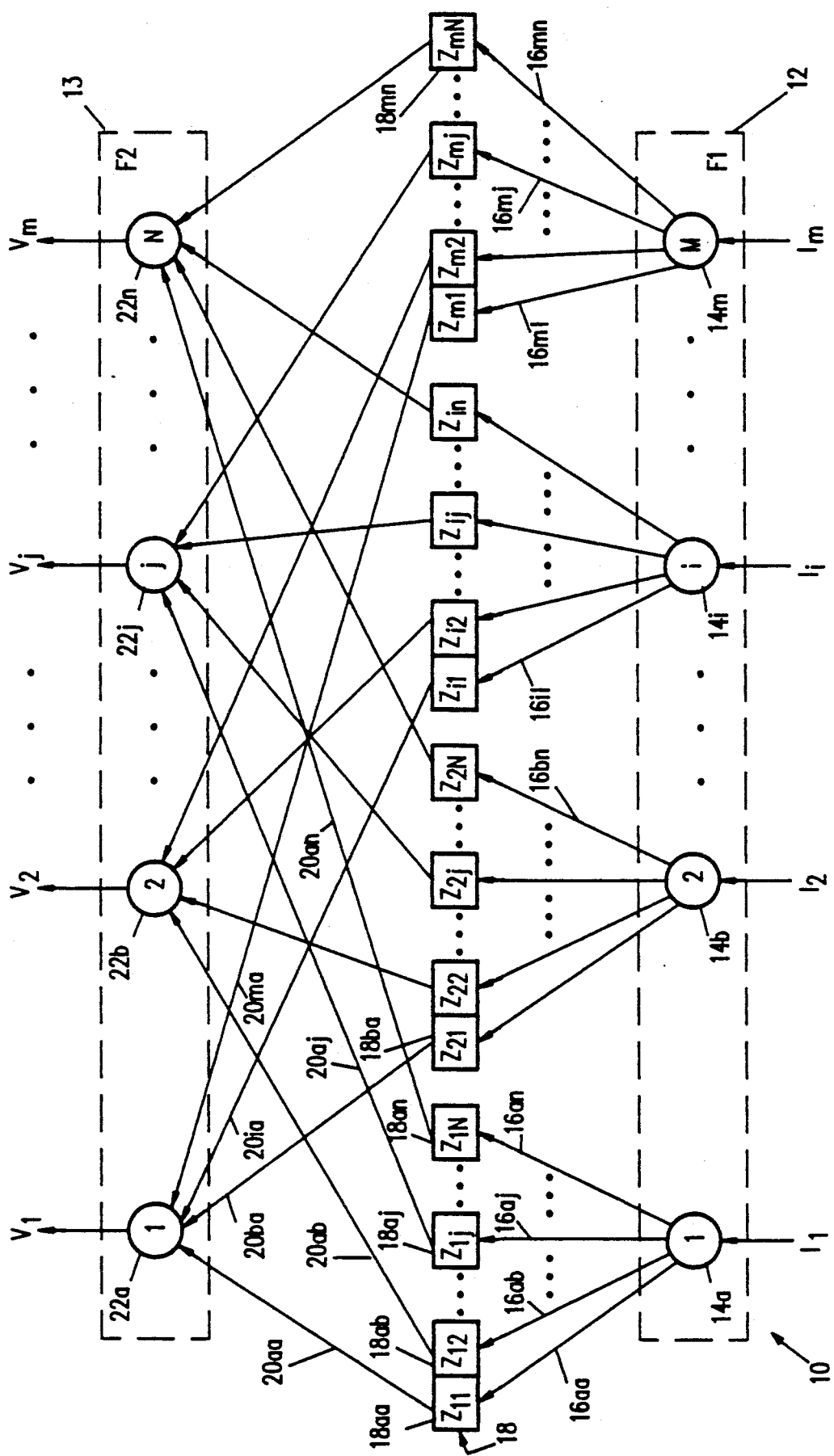
FIG. 1 illustrates in simplified, functional block diagram form a neural network structured in accordance with the competitive learning model.
Figure 2:
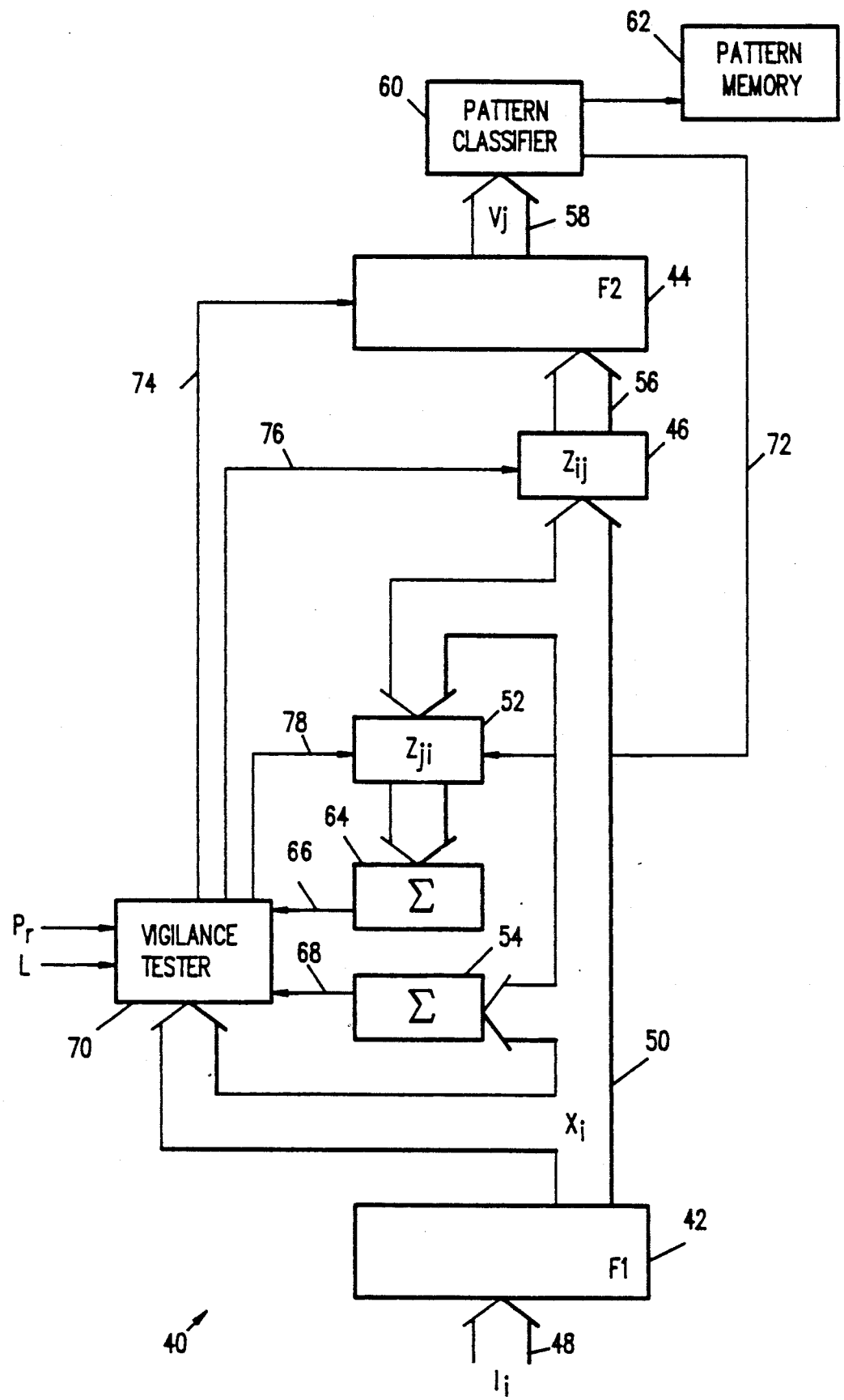
FIG. 2 illustrates in simplified, functional block diagram form a neural network structured in accordance with the adaptive resonance theory network model.
Figure 3:
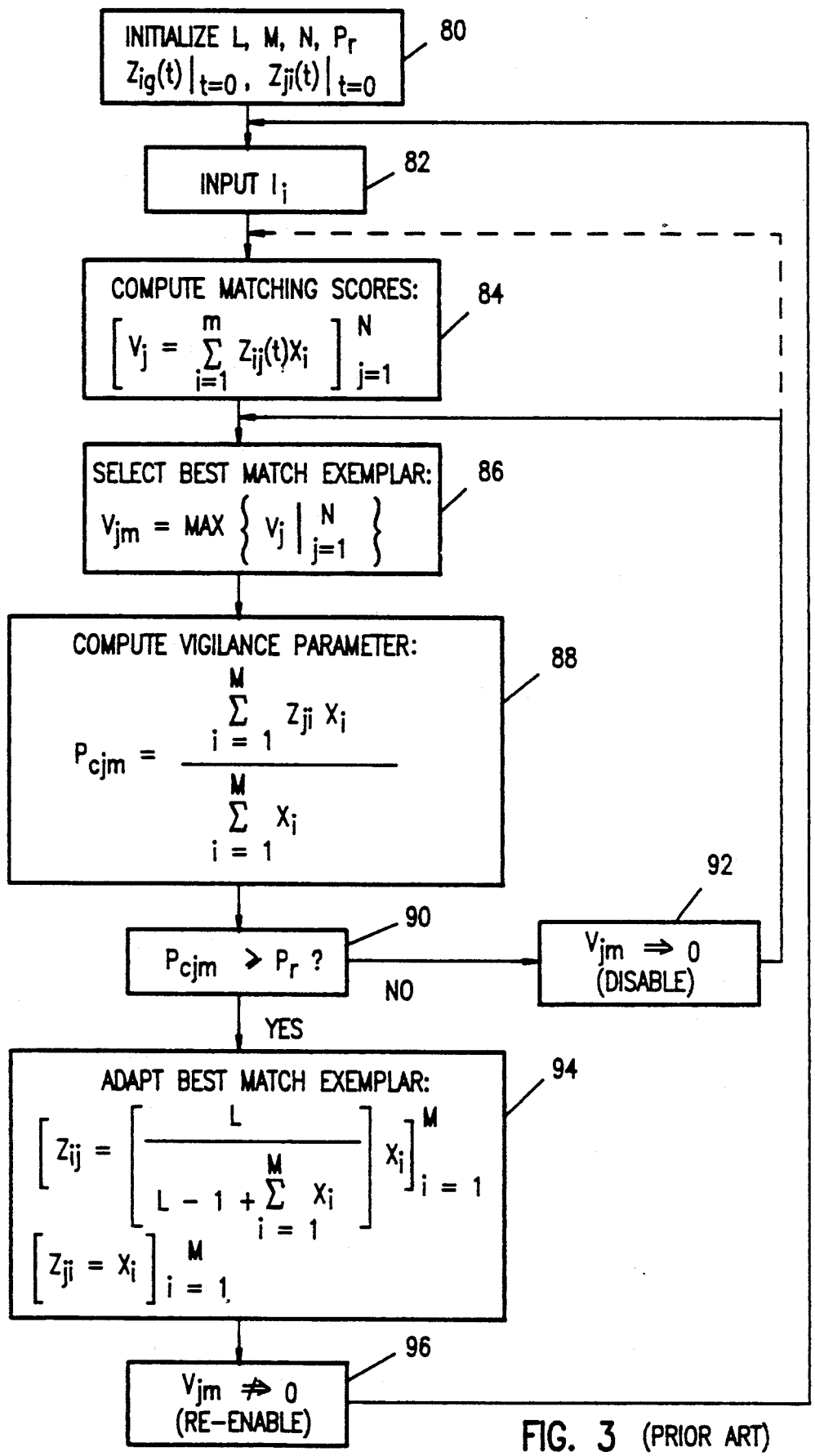
FIG. 3 illustrates in flow chart form the operational steps of a neural network structured in accordance with the adaptive resonance theory.

The network 100 is initialized in accordance with the adaptive resonance theory network. The convergence parameter L is initialized with a value of two (i.e., L=2). As will be recognized by one of ordinary skill in the art, the convergence parameter L can be preset to virtually any other higher value. However, the order of search would be different and convergence of the bottom-up matrix coefficients' adaptations (step 94 in FIG. 3) might take longer. The values for M and N are preset to equal the number of input and output neurons, respectively. In a preferred embodiment, M is preset at 64 to coincide with an 8×8 pixel video frame (as discussed above) used to generate the input subject pattern information $I_i$. The value for N is set at 10 to equal the number of subject digit patterns (i.e., "0"–"9") sought to be recognized.

After the neural network 100 has been initialized, as described above, the subject pattern information $I_i$ sought to be recognized is inputted into the F1 layer 102. The pattern signals $X_i$ generated by the input neurons within the F1 layer 102 are multiplied by their associated top-down adaptive weight matrix coefficients $Z_{ji}$ within the top-down adaptive weight matrix multiplier 108, and the respective products thereof are summed together in the top-down summer 112. The resulting summation 114 is transferred to the vigilance tester 104.

This summation 114 is divided by the summation 116 of the pattern signals $X_i$ produced by the pattern signal summer 106. This quotient is the computed vigilance parameter $P_{cj}$.

This computed vigilance parameter $P_{cj}$ is compared against its associated reference vigilance parameter $P_{rj}$, which was initialized to a value of one (i.e., $P_{rj}=1$). If the computed vigilance parameter $P_{cj}$ is less than the reference vigilance parameter $P_{rj}$, then a reduced reference vigilance parameter $P_{rrj}$ is generated by reducing the original reference vigilance parameter $P_{rj}$ by a small, selectable increment $\Delta$ (e.g., $\Delta=0.02$). This reduced reference vigilance parameter $P_{rrj}$ is reduced incrementally until it equals or is exceeded by the computed vigilance parameter $P_{cj}$, at which point the reduced reference vigilance parameter $P_{rrj}$ is stored as the adjusted reference vigilance parameter $P_{arj}$ within the vigilance parameter memory 118.

If the computed vigilance parameter $P_{cj}$ initially equalled or exceeded the original reference vigilance parameter $P_{rj}$, then the original reference vigilance parameter $P_{rj}$ is stored without reduction as the adjusted reference vigilance parameter $P_{arj}$ in the vigilance parameter memory 118. The foregoing computation of vigilance parameters $P_{cj}$ and comparisons with their associated reference vigilance parameters $P_{rj}$ are repeated so that individual and distinct adjusted reference vigilance parameters $P_{arj}$ are stored in the vigilance parameter memory 118 to correspond respectively with each output neuron within the F2 layer 120.

Once all adjusted reference vigilance parameters $P_{arj}$ have been computed and stored within the vigilance parameter memory 118, the stored, adjusted reference vigilance parameter $P_{arj}$ having the highest value is used to select the learned pattern which is to be designated as the pattern most closely matching the input subject pattern information $I_i$. The pattern data 124 representing this selected, learned pattern stored within the pattern memory 122 is outputted therefrom.

In an alternative preferred embodiment of a neural network 100 in accordance with the present invention, the computed vigilance parameters $P_{cj}$ corresponding respectively with each output neuron within the F2 layer 120 are stored in the vigilance parameter memory 118. Once all computed vigilance parameters $P_{cj}$ have been computed and stored within the vigilance parameter memory 118, the stored, computed vigilance parameter $P_{cj}$ having the highest value is used to select the learned pattern which is to be designated as the pattern most closely matching the input subject pattern information $I_i$. The pattern data 124 representing this selected, learned pattern stored within the pattern memory 122 is outputted therefrom.

Thus, as will be recognized by one of ordinary skill in the art, the neural network 100 in accordance with the present invention prevents memory washout by not changing its bottom-up $Z_{ij}$ or top-down $Z_{ji}$ adaptive weight matrices' coefficients when analyzing new subject pattern information $I_i$. Rather, a computed vigilance parameter $P_{cj}$ is compared against a reference vigilance parameter $P_{rj}$ and the learned pattern corresponding to the highest computed vigilance parameter $P_{cj}$ becomes selected as the learned pattern most closely matching the subject pattern sought to be recognized.

Furthermore, the neural network 100 in accordance with the present invention prevents excessive clustering of patterns. Instead of comparing subject pattern information against a fixed reference vigilance parameter and creating new clusters of patterns when the subject pattern information fails the vigilance parameter test with the fixed reference vigilance parameter, the neural network 100 in accordance with the present invention matches an existing, i.e., previously "learned," pattern cluster corresponding to the highest computed vigilance parameter with the subject pattern information.

Figure 6:
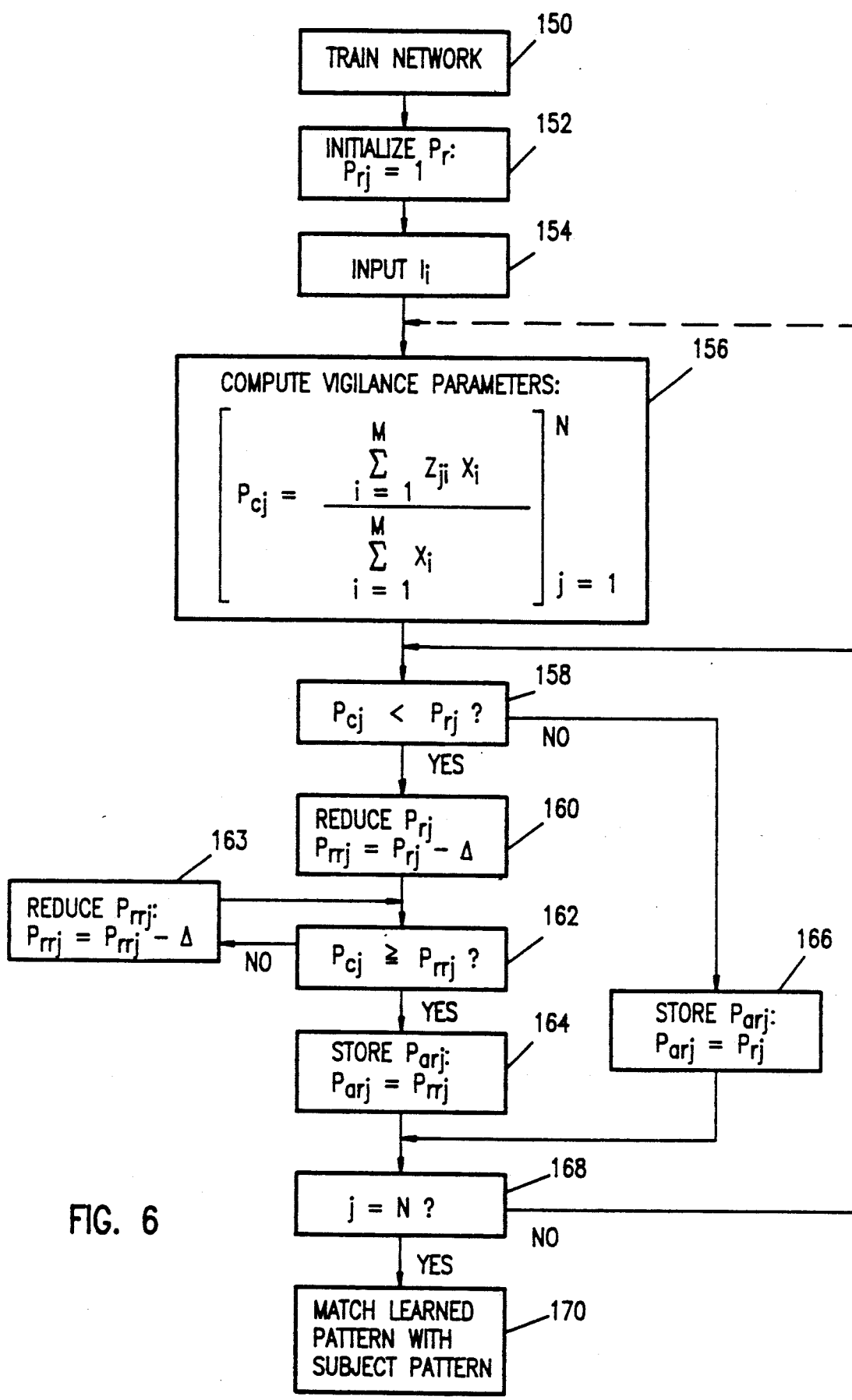
FIG. 6 illustrates in flow chart form the operational steps of a preferred embodiment of a neural network in accordance with the present invention.

Referring to FIG. 6, the operational steps are summarized for a preferred embodiment of a neural network 100 in accordance with the present invention. The first step 150 is to train the network 100. This is done in accordance with the adaptive resonance theory network, as described above and illustrated in FIG. 3.

The next step 152 is to initialize the reference vigilance parameter vector $P_r$. This is done by setting the reference vigilance parameters $P_{rj}$ equal to one (i.e., $P_r=1$).

The next step 154 is to input the subject pattern information $I_i$ which is sought to be recognized into the F1 layer 102.

The next step 156 is to compute vigilance parameters $P_{cj}$ corresponding to each of the output neurons within the F2 layer 120. Mathematically, this is done in accordance with the following formula:

$$\left[ P_{cj} = \frac{\sum_{i=1}^{M} Z_{ji} X_i}{\sum_{i=1}^{M} X_i} \right]_{j=1}^{N}$$

The next step 158 is to compare the computed vigilance parameters $P_{cj}$ with their associated reference vigilance parameters $P_{rj}$. If the computed vigilance parameter $P_{cj}$ is less than its associated reference vigilance parameter $P_{rj}$, the next step 160 is to reduce the value of the reference vigilance parameter $P_r$ by a small, selectable increment $\Delta$. This reduced reference vigilance parameter $P_{rrj}$ is then compared in the next step 162 with the computed vigilance parameter $P_{cj}$. If the reduced reference vigilance parameter $P_{rrj}$ is still greater than the computed vigilance parameter $P_{cj}$, the step 163 of further reducing the reduced reference vigilance parameter $P_{rrj}$ is performed until it is less than the computed vigilance parameter $P_{cj}$.

Once the computed vigilance parameter $P_{cj}$ equals or exceeds the reduced reference vigilance parameter $P_{rrj}$, the next step 164 is to store this value of the reduced reference vigilance parameter $P_{rrj}$ in the vigilance parameter memory as an adjusted reference vigilance parameter $P_{arj}$.

If, when performing the step 158 of comparing the computed vigilance parameter $P_{cj}$ with the original, unreduced reference vigilance parameter $P_{rj}$, the computed vigilance parameter $P_{cj}$ equalled or exceeded the reference vigilance parameter $P_{rj}$, the step 160 of reducing the value of the reference vigilance parameter $P_{rj}$ is unnecessary. In that case, the next step 166 is to store the existing value of the reference vigilance parameter $P_{rj}$ as the adjusted reference vigilance parameter $P_{arj}$.

The next step 168 is to determine whether the foregoing vigilance parameter testing steps have been completed for all potential learned patterns corresponding to the output neurons within the F2 layer 120. If not, depending upon whether the computed vigilance parameters $P_{cj}$ have been stored for the above-described comparisons against the reference vigilance parameters $P_{rj}$, the operation of the neural network 100 resumes with the step 156 of computing the vigilance parameters $P_{cj}$ or the step 158 of comparing the stored values of the computed vigilance parameters $P_{cj}$ with the reference vigilance parameters $P_{rj}$.

Once all adjusted reference vigilance parameters $P_{arj}$ have been computed and stored, the next step 170 is to match a learned pattern with the subject pattern. This is done by selecting, from among the adjusted reference vigilance parameters $P_{arj}$, the maximally valued adjusted reference vigilance parameter $P_{arjm}$ within the vigilance parameter memory 118 and selecting from the pattern memory 122 the learned pattern corresponding thereto.

Figure 7:
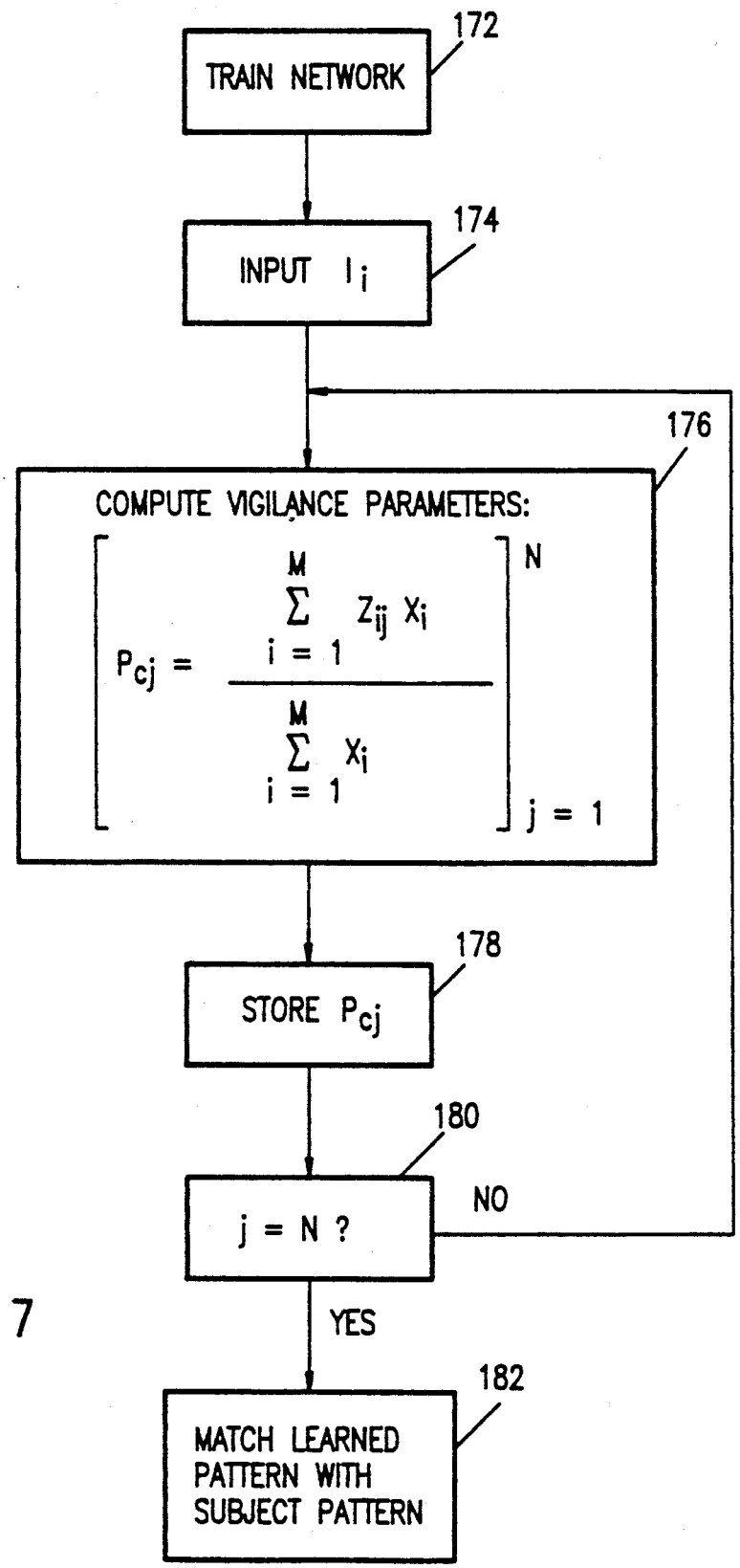
FIG. 7 illustrates in flow chart form the operational steps of an alternative preferred embodiment of a neural network in accordance with the present invention.

Referring to FIG. 7, the operational steps are summarized for an alternative preferred embodiment of a neural network 100 in accordance with the present invention. The first step 172 is to train the network 100. This is done in accordance with the adaptive resonance theory network, as described above and illustrated in FIG. 3.

The next step 174 is to input the subject pattern information $I_i$ which is sought to be recognized into the F1 layer 102.

The next step 176 is to compute vigilance parameters $P_{cj}$ corresponding to each of the output neurons within the F2 layer 120. Mathematically, this is done in accordance with the following formula:

$$\left[ P_{cj} = \frac{\sum_{i=1}^{M} Z_{ji} X_i}{\sum_{i=1}^{M} X_i} \right]_{j=1}^{N}$$

The next step 178 is to store the computed vigilance parameters $P_{cj}$, followed by the step 180 of determining whether the foregoing vigilance parameter computation steps have been completed for all potential learned patterns corresponding to the output neurons within the F2 layer 120. If not, the operation of the neural network 100 resumes with the step 176 of computing the vigilance parameters $P_{cj}$.

Once all computed vigilance parameters $P_{cj}$ have been computed and stored, the next step 182 is to match a learned pattern with the subject pattern.

This is done by selecting, from among the computed vigilance parameters $P_{cj}$, the maximally valued computed vigilance parameter $P_{cjm}$ within the vigilance parameter memory 118 and selecting from the pattern memory 122 the learned pattern corresponding thereto.

Figures 8, 9:
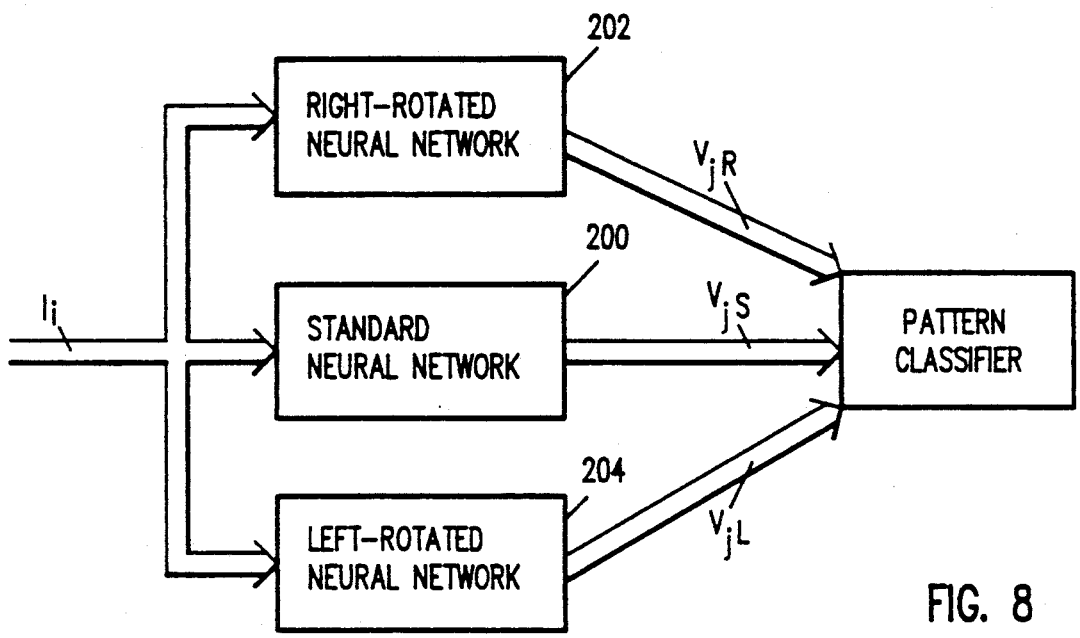
FIG. 8 illustrates in simplified, functional block diagram form a neural network system using multiple neural networks in accordance with the present invention.
FIG. 9 illustrates sample test patterns and resultant pattern recognition data for a neural network system using multiple neural networks in accordance with the present invention.

As shown in FIG. 8, a neural network system can be constructed using multiple neural networks 200, 202, 204 in accordance with the present invention for the purpose of learning several variations of the reference patterns to be stored for subsequent matching with subject pattern information sought to be recognized. For example, in addition to a neural network 200 corresponding to standard patterns representing the ten digits "0"–"9," two additional neural networks 202, 204 can be used, one network 202 for learning patterns representing the digits "0"–"9" selectively rotated clockwise (right-rotated), and another network 204 for learning patterns representing the digits "0"–"9" selectively rotated counter-clockwise (left-rotated).

As described above for a preferred embodiment of a neural network in accordance with the present invention, separate maximum adjusted reference vigilance parameters $P_{arjSm}$, $P_{arjLm}$, $P_{arjRm}$ can then be computed and stored for each of these three neural networks 200, 202, 204. The overall maximum adjusted reference vigilance parameter $P_{arjm}$ can then be selected from among the respective vigilance parameter memories within the three networks 200, 202, 204 for selecting the learned digit pattern (e.g., standard, right-rotated or left-rotated) best matching the subject pattern sought to be recognized.

Sample input patterns and the recognition results for a neural network system using three neural networks 200, 202, 204 in accordance with a preferred embodiment of the present invention, as discussed above, are shown in FIG. 9. Input pattern Groups "A" and "B" consist of four versions of the numerals "1" and "2," respectively. The three neural networks 200, 202, 204 constructed and operating in accordance with a preferred embodiment of the present invention produced maximum adjusted reference vigilance parameters $P_{arjSm}$, $P_{arjLm}$, $P_{arjRm}$ for each network and recognition results based upon the overall maximum adjusted reference vigilance parameter $P_{arjm}$ for the system as shown.

Alternatively, as described above for an alternative preferred embodiment of a neural network in accordance with the present invention, the computed vigilance parameters $P_{cj}$ can be stored for each of these three neural networks 200, 202, 204. The maximum computed vigilance parameter $P_{cjm}$ can then be selected from among the respective vigilance parameter memories within the three networks 200, 202, 204 for selecting the learned digit pattern (e.g., standard, right-rotated or left-rotated) best matching the subject pattern sought to be recognized.

As will be recognized by one of ordinary skill in the art, any number of neural networks in accordance with the present invention can be used for learning and recognizing alternative subject pattern variations. For example, multiple networks can be used for learning and recognizing subject patterns having virtually any pattern variations or distortions known or expected a priori.

It should be understood that various alternatives to the embodiments of the present invention described herein may be employed in practicing the present invention. It is intended that the following claims define the scope of the present invention and that structures and methods within the scope of these claims and their equivalents be covered thereby.

What is claimed is:

1. An improved self-organizing neural network coupled to perform adaptive pattern recognition in accordance with adaptive resonance theory, said neural network comprising a plurality of input neurons coupled to accept input pattern data representing a pattern, a plurality of output neurons, a bottom-up adaptive weight matrix coupling said input neurons to said output neurons, a top-down adaptive weight matrix coupling said output neurons to said input neurons, and vigilance parameter computing means for computing a plurality of vigilance parameters based substantially upon said input pattern data, said improvement comprising:
   memory means for storing said plurality of computed vigilance parameters; and
   pattern classification means for classifying said pattern according to the maximum computed vigilance parameter among said plurality of computed vigilance parameters.

2. An improved self-organizing neural network coupled to perform adaptive pattern recognition in accordance with adaptive resonance theory, said neural network comprising a plurality of input neurons coupled to accept input pattern data representing a pattern, a plurality of output neurons, a bottom-up adaptive weight matrix coupling said input neurons to said output neurons, a top-down adaptive weight matrix coupling said output neurons to said input neurons, vigilance parameter computing means for computing a plurality of vigilance parameters based substantially upon said input pattern data, and vigilance parameter comparator means for individually comparing said plurality of computed vigilance parameters with a predetermined reference vigilance parameter, said improvement comprising:
   vigilance parameter adjustment means for selectively adjusting said predetermined reference vigilance parameter in response to said comparisons thereof with said plurality of computed vigilance parameters, said adjustment resulting in a plurality of adjusted reference vigilance parameters;
   memory means for storing said plurality of adjusted reference vigilance parameters; and
   pattern classification means for classifying said pattern according to the maximum adjusted reference vigilance parameter among said plurality of adjusted reference vigilance parameters.

3. A neural network coupled to perform adaptive pattern recognition, said neural network comprising:
   vigilance parameter computing means for computing a plurality of vigilance parameters based substantially upon input pattern data representing a pattern;
   memory means for storing said plurality of computed vigilance parameters; and
   pattern classification means for classifying said pattern according to the maximum computed vigilance parameter among said plurality of computed vigilance parameters.

4. A neural network coupled to perform adaptive pattern recognition, said neural network comprising:
   vigilance parameter adjustment means for selectively adjusting a predetermined reference vigilance parameter in response to comparisons thereof with a plurality of computed vigilance parameters based upon input pattern data representing a pattern, said adjustment resulting in a plurality of adjusted reference vigilance parameters;
   memory means for storing said plurality of adjusted reference vigilance parameters; and
   pattern classification means for classifying said pattern according to the maximum adjusted reference vigilance parameter among said plurality of adjusted reference vigilance parameters.

5. A neural network coupled to perform adaptive pattern recognition, said neural network comprising:

input means for receiving a plurality of input pattern signals $I_i$ and outputting a plurality of corresponding pattern signals $X_i$ (i=1,2,3, ..., M), wherein each one of said input pattern signals $I_i$ represents a portion of a pattern;

pattern recognition means for providing a plurality of interim pattern signals $V_j$ (j=1,2,3, ..., N), wherein each one of said interim pattern signals $V_j$ represents said pattern;

bottom-up coupling means for coupling said plurality of pattern signals $X_i$ to said pattern recognition means, said bottom-up coupling means having coupling coefficients $Z_{ij}$;

computation means coupled to said input means for computing a plurality of vigilance parameters $P_{cj}$ based substantially upon said plurality of pattern signals $X_i$;

top-down coupling means for coupling said pattern signals $X_i$ to said computation means, said top-down coupling means having coupling coefficients $Z_{ji}$;

a plurality of memory circuits coupled to selectively store said plurality of vigilance parameters; and a pattern classification circuit coupled to generate an output pattern signal representing said pattern based upon said stored plurality of vigilance parameters.

6. A neural network as recited in claim 5 further comprising comparator means for receiving a predetermined reference vigilance parameter $P_r$ and for comparing each one of said plurality of computed vigilance parameters $P_{cj}$ therewith, and still further comprising adjustment means for selectively adjusting said reference vigilance parameter $P_r$ in response to each one of said comparisons thereof with said plurality of computed vigilance parameters $P_{cj}$.

7. A neural network as recited in claim 5, wherein said input means comprises a plurality of M nodes and said input pattern signals $I_i$ comprise analog signals.

8. A neural network as recited in claim 5, wherein said input means comprises a plurality of M digital registers and said input pattern signals $I_i$ comprise digital signals.

9. A neural network as recited in claim 5, wherein said pattern recognition means comprises a plurality of N nodes and said interim pattern signals $V_j$ comprise analog signals.

10. A neural network as recited in claim 5, wherein said pattern recognition means comprises a plurality of N digital registers and said interim pattern signals $V_j$ comprise digital signals.

11. A neural network as recited in claim 5, wherein said bottom-up coupling means comprises a bottom-up adaptive weight matrix having a plurality of transistors coupled to selectively weight said plurality of pattern signals $X_i$, wherein the respective ratios of said weighted pattern signals to corresponding ones of said plurality of pattern signals $X_i$ represent said coupling coefficients $Z_{ij}$.

12. A neural network as recited in claim 5, wherein said bottom-up coupling means comprises a bottom-up adaptive weight matrix having a plurality of resistors coupled to selectively weight said plurality of pattern signals $X_i$, wherein the respective ratios of said weighted pattern signals to corresponding ones of said plurality of pattern signals $X_i$ represent said coupling coefficients $Z_{ij}$.

13. A neural network as recited in claim 5, wherein said bottom-up coupling means comprises a bottom-up adaptive weight matrix having a plurality of digital circuits coupled to selectively weight said plurality of pattern signals $X_i$, wherein the respective ratios of said weighted pattern signals to corresponding ones of said plurality of pattern signals $X_i$ represent said coupling coefficients $Z_{ij}$.

14. A neural network as recited in claim 5, wherein said top-down coupling means comprises a top-down adaptive weight matrix having a plurality of transistors coupled to selectively weight said plurality of pattern signals $X_i$, wherein the respective ratios of said weighted pattern signals to corresponding ones of said plurality of pattern signals $X_i$ represent said coupling coefficients $Z_{ji}$.

15. A neural network as recited in claim 5, wherein said top-down coupling means comprises a top-down adaptive weight matrix having a plurality of resistors coupled to selectively weight said plurality of pattern signals $X_i$, wherein the respective ratios of said weighted pattern signals to corresponding ones of said plurality of pattern signals $X_i$ represent said coupling coefficients $Z_{ji}$.

16. A neural network as recited in claim 5, wherein said top-down coupling means comprises a top-down adaptive weight matrix having a plurality of digital circuits coupled to selectively weight said plurality of pattern signals $X_i$, wherein the respective ratios of said weighted pattern signals to corresponding ones of said plurality of pattern signals $X_i$ represent said coupling coefficients $Z_{ji}$.

17. A neural network as recited in claim 5, wherein said computation means comprises an analog signal summing circuit and said pattern signals $X_i$ comprise analog signals, said analog signal summing circuit operating according to the formula:

$$\left[ P_{cj} = \frac{\sum_{i=1}^{M} Z_{ji} X_i}{\sum_{i=1}^{M} X_i} \right]_{j=1}^{N}$$

18. A neural network as recited in claim 5, wherein said computation means comprises a digital adder circuit and said pattern signals $X_i$ comprise digital signals, said digital adder circuit operating according to the formula:

$$\left[ P_{cj} = \frac{\sum_{i=1}^{M} Z_{ji} X_i}{\sum_{i=1}^{M} X_i} \right]_{j=1}^{N}$$

19. A neural network as recited in claim 6, wherein said comparator means comprises an analog comparator circuit, and said computed vigilance parameter $P_{cj}$ and said predetermined reference vigilance parameter $P_r$ comprise voltages, said analog comparator circuit being coupled to determine whether said computed vigilance parameter $P_{cj}$ equals or exceeds said predetermined reference vigilance parameter $P_r$ and operating according to the formula:

$$\left[ P_{cj} \overset{?}{\geq} P_r \right]_{j=1}^{N}$$

20. A neural network as recited in claim 6, wherein said comparator means comprises a digital comparator circuit, and said computed vigilance parameter $P_{cj}$ and said predetermined reference vigilance parameter $P_r$ comprise digital signals, said digital comparator circuit being coupled to determine whether said computed vigilance parameter $P_{cj}$ equals or exceeds said predetermined reference vigilance parameter $P_r$ and operating according to the formula:

$$\left[ P_{cj} \overset{?}{\geq} P_r \right]_{j=1}^{N}$$

21. A neural network as recited in claim 6, wherein said adjustment means comprises an analog signal summing circuit, and said reference vigilance parameter $P_r$ and said computed vigilance parameter $P_{cj}$ comprise analog signals.

22. A neural network as recited in claim 6, wherein said adjustment means comprises a digital adder circuit, and said reference vigilance parameter $P_r$ and said computed vigilance parameter $P_{cj}$ comprise digital signals.

23. A method of performing adaptive pattern recognition using a self-organizing neural network, said neural network comprising a plurality of M input neurons coupled to accept input pattern data signals $I_i$ ($i = 1, 2, 3, \ldots, M$) representing a pattern and a plurality of N output neurons coupled to provide pattern output signals $V_j$ ($j = 1, 2, 3, \ldots, N$) corresponding to said pattern, said neural network further comprising a bottom-up adaptive weight matrix having coefficients $Z_{ij}$ and coupling said input neurons to said output neurons, and a top-down adaptive weight matrix having coefficients $Z_{ji}$ and coupling said output neurons to said input neurons, said neural network still further comprising vigilance parameter computing means for computing a plurality of vigilance parameters $P_{cj}$ based substantially upon said input pattern data signals $I_i$ and said bottom-up adaptive weight matrix coefficients $Z_{ij}$, and vigilance parameter comparator means for individually comparing said plurality of computed vigilance parameters $P_{cj}$ with a predetermined reference vigilance parameter $P_r$, said method comprising the steps of:
   training said neural network by inputting a plurality of reference pattern data signals $I_{ir}$ representing a plurality of reference patterns into said plurality of M input neurons;
   analyzing a subject pattern by inputting pattern data signals $I_i$ corresponding thereto into said plurality of M input neurons; and
   classifying said subject pattern according to a pattern output signal $V_{jm}$ from the one of said plurality of N output neurons which corresponds to an associated vigilance parameter $P_{ajm}$ having the maximum value among a plurality of associated vigilance parameters $P_{aj}$, said step of classifying said subject pattern comprising outputting an output pattern signal encoded to represent said subject pattern.

24. A method of performing adaptive pattern recognition using a self-organizing neural network as recited in claim 23, wherein said step of training said neural network comprises the steps of:
   initializing said coefficients $Z_{ij}$ of said bottom-up adaptive weight matrix, said coefficients $Z_{ji}$ of said top-down adaptive weight matrix, and said value $P_r$ of said reference vigilance parameter;
   applying said reference input pattern data signals $I_{ir}$ representing a reference pattern to said plurality of M input neurons, selectively scaling said reference input pattern data signals $I_{ir}$ by a predetermined scaling factor, and generating corresponding reference pattern signals $X_{ir}$;
   generating within each one of said output neurons a plurality of reference pattern output signals $V_{jr}$ ($j = 1, 2, 3, \ldots, N$) corresponding to said reference pattern;
   selecting a reference pattern output signal $V_{jrm}$, said selected reference pattern output signal $V_{jrm}$ corresponding to the one of said output neurons which best represents said reference pattern;
   computing a vigilance parameter $P_{cjm}$, said computed vigilance parameter $P_{cjm}$ being associated with said output neuron corresponding to said selected reference pattern output signal $V_{jrm}$;
   comparing said computed vigilance parameter $P_{cjm}$ to said reference vigilance parameter $P_r$;
   if $P_{cjm} < P_r$, disabling temporarily said output neuron corresponding to said selected reference pattern output signal $V_{jrm}$, selecting a new reference pattern output signal $V_{jrm}$, and repeating the foregoing steps, beginning with said step of computing a vigilance parameter $P_{cjm}$;
   if $P_{cjm} \geq P_r$, adapting the corresponding ones of said coefficients $Z_{ij}$, $Z_{ji}$ of said bottom-up and top-down adaptive weight matrices; and
   enabling any output neurons previously disabled in the foregoing disabling step and repeating the foregoing steps, beginning with said step of applying reference input pattern data signals $I_{ir}$.

25. A method of performing adaptive pattern recognition using a self-organizing neural network as recited in claim 24, wherein said step of initializing comprises the steps of:
   selectively initializing said coefficients $Z_{ij}$ of said bottom-up adaptive weight matrix according to the formula:

$$\left[ \left[ 0 < Z_{ij}(t) \big|_{t=0} = Z_{ij}(0) < \frac{L}{(L - 1 + M)} \right]_{j=1}^{N} \right]_{i=1}^{M}$$

where $Z_{ij}(t)$ = coefficients of bottom-up weight matrix at time $t$ $L$(preselected constant) $> 1$;

initializing said coefficients $Z_{ji}$ of said top-down adaptive weight matrix according to the formula:

$$[[Z_{ji}(t) \big|_{t=0} = Z_{ji}(0) = 1]_{j=1}^{N}]_{i=1}^{M}$$

-continued where $Z_{ji}(t)$ = coefficients of top-down weight matrix at time $t$;

and selectively initializing said value $P_r$ of said reference vigilance parameter according to the formula:

$$0 < P_r < 1.$$

26. A method of performing adaptive pattern recognition using a self-organizing neural network as recited in claim 24, wherein said step of generating a plurality of reference pattern output signals $V_{jr}$ is performed according to the formula:

$$\left[ V_{jr} = \sum_{i=1}^{M} Z_{ij}(t) X_{ir} \right]_{j=1}^{N}$$

where $Z_{ij}(t)$ = coefficients of bottom-up weight matrix at time $t$.

27. A method of performing adaptive pattern recognition using a self-organizing neural network as recited in claim 24, wherein said step of selecting a reference pattern output signal $V_{jrm}$ comprises selecting the reference pattern output signal $V_{jrm}$ having the maximum value among all of said reference pattern output signals $V_{jr}$ according to the formula:

$$V_{jrm} = \text{MAX}\{V_{jr}|_{j=1}^{N}\}$$

by inhibiting all other output neurons not corresponding thereto.

28. A method of performing adaptive pattern recognition using a self-organizing neural network as recited in claim 24, wherein said step of computing said computed vigilance parameter $P_{cjm}$ is performed according to the formula:

$$P_{cjm} = \frac{\sum_{i=1}^{M} Z_{ji} X_i}{\sum_{i=1}^{M} X_i}$$

29. A method of performing adaptive pattern recognition using a self-organizing neural network as recited in claim 24, wherein said step of adapting said coefficients $Z_{ij}$, $Z_{ji}$ of said bottom-up and top-down adaptive weight matrices is performed according to the formulas:

$$\left[ Z_{ij} = \left[ \frac{L}{L - 1 + \sum_{i=1}^{M} X_{ir}} \right] X_{ir} \right]_{i=1}^{M}$$

$$[Z_{ji} = X_{ir}]_{i=1}^{M}$$

where $L$ (preselected constant) > 1.

30. A method of performing adaptive pattern recognition using a self-organizing neural network as recited in claim 23, wherein said step of analyzing a subject pattern comprises the steps of:

applying said input pattern data signals $I_i$ representing a subject pattern to said plurality of M input neurons, selectively scaling said input pattern data signals $I_i$ by a predetermined scaling factor, and generating corresponding pattern signals $X_i$;

computing said plurality of computed vigilance parameters $P_{cj}$, each one of said plurality of computed vigilance parameters $P_{cj}$ being respectively associated with one of said plurality of N output neurons; and selectively storing said plurality of computed vigilance parameters $P_{cj}$ in a random access memory as said plurality of associated vigilance parameters $P_{aj}$.

31. A method of performing adaptive pattern recognition using a self-organizing neural network as recited in claim 30, wherein said step of computing said plurality of computed vigilance parameters $P_{cj}$ is performed according to the formula:

$$\left[ P_{cj} = \frac{\sum_{i=1}^{M} Z_{ji} X_i}{\sum_{i=1}^{M} X_i} \right]_{j=1}^{N}$$

32. A method of performing adaptive pattern recognition using a self-organizing neural network as recited in claim 30 further comprising the steps of:

re-initializing said value $P_r$ of said reference vigilance parameter according to the formula:

$$P_r = 1;$$

comparing said plurality of computed vigilance parameters $P_{cj}$ to said reference vigilance parameter $P_r$;

if $P_{cj} < P_r$, reducing said value $P_r$ of said reference vigilance parameter by a selectable amount $\Delta$, re-comparing said computed vigilance parameter $P_{cj}$ to said reduced reference vigilance parameter $P_{rrj}$ (where $P_{rrj} = P_r - \Delta$), and continuing to reduce said reduced reference vigilance parameter $P_{rrj}$ until $P_{cj} \geq P_{rrj}$;

if $P_{cj} \geq P_r$, storing said reference vigilance parameter $P_r$ in a random access memory as said associated vigilance parameter $P_{aj}$;

if $P_{cj} \geq P_{rrj}$, storing said reduced reference vigilance parameter $P_{rrj}$ as said associated vigilance parameter $P_{aj}$ in a random access memory; and repeating the foregoing steps until each one of said plurality of N output neurons has associated respectively therewith an associated vigilance parameter $P_{aj}$.

33. A method of performing adaptive pattern recognition using a self-organizing neural network as recited in claim 32, wherein said step of computing said plurality of computed vigilance parameters $P_{cj}$ is performed according to the formula:

$$\left[ P_{cj} = \frac{\sum_{i=1}^{M} Z_{ji} X_i}{\sum_{i=1}^{M} X_i} \right]_{j=1}^{N}$$

* * * * *